United States Patent Office 3,227,043
Patented Jan. 4, 1966

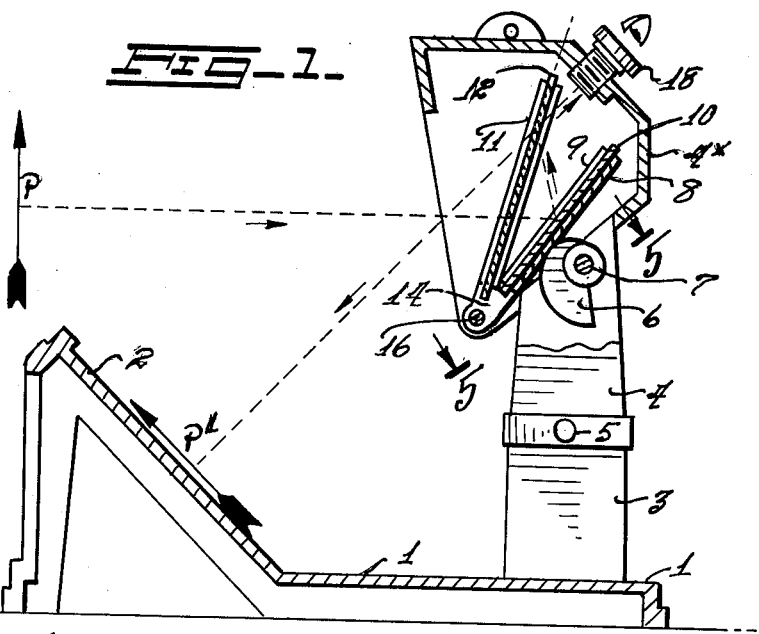
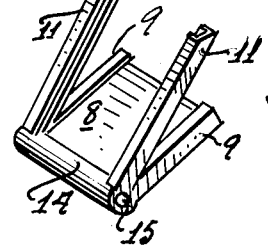
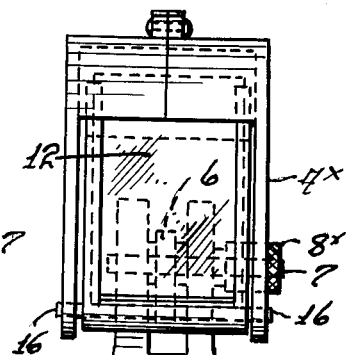
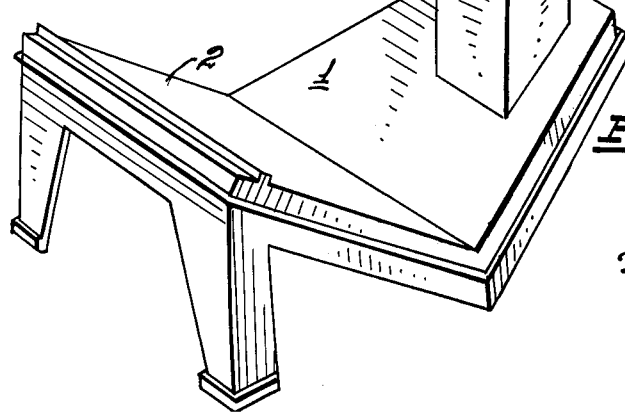
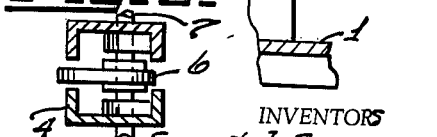

3,227,043
CAMERA LUCIDA DRAWING INSTRUMENT WITH INTENSITY CONTROL
Ernest J. Swimmer, 340 E. 52nd St., New York, N.Y., and Richard I. Koontz, Thompson Road, Syracuse 14, N.Y.
Filed Aug. 30, 1962, Ser. No. 220,451
1 Claim. (Cl. 88—75)

In the use of the instrument known as a camera lucida, by which the image of an external object is made to appear on a sheet of paper or the like, upon which it may be traced, there have been certain difficulties with regard to the relative brightness of the object image and the image thereof upon the paper or other surface. If the object image is too strong, the reproducing pencil, pen or crayon employed by the operator cannot be observed by him, and if the object image is too weak it cannot be seen in sufficient detail. Also, dark and light colored drawing papers require a different balance of object image and drawing surface brightness. When drawing an object, thrown upon the drawing paper, it is frequently desirable to bring up the brightness of the object image in order that the draftsman may better see certain details, and at other times it is desirable to subdue the object image and bring up the brightness of the drawing as it has proceeded, in order to observe it more clearly. By means of the present invention, the said difficulties are overcome.

The invention will be described with reference to the accompanying drawings, in which:

FIG. 1 is a side elevation, partly broken away, showing an embodiment of the invention, dotted lines leading from an arrow which represents an object, thence from the mirrors as an image thrown upon an inclined surface;

FIG. 2 is a perspective view of the structure shown in FIG. 1;

FIG. 3 is a front elevation, partly broken away;

FIG. 4 is a perspective view of the carrier for the mirrors;

FIG. 5 is a transverse section taken on the line 5—5, FIG. 1.

The device consists of a base member 1 having an inclined front extension 2, upon which a sheet may be placed for receiving the object image, and to enable the operator to reproduce the image by drawing on the sheet.

At the rear of the base member 1 is a short standard 3, which in this instance is rectangular and preferably hollow. Embracing the standard is a tubular member 4 having a set-screw at 5. Inasmuch as member 4 tapers towards its top, it will be received upon standard 3 for a required short distance only. The set-screw enables it to be clamped on the standard and to be released and withdrawn therefrom.

The tubular member 4 is provided with an enlarged head $4^x$, having an aperture at its base for manual operation of a cam 6. This cam is fixed to a shaft 7 which projects through tubular member 4, and carries at its outer end a fingerpiece $8^x$ for manual rotation of the cam.

The cam 6 acts directly upon the bottom plate 8 of a carrier for the mirrors, opposed channel members 9 of the carrier slidingly receive the rear reflecting mirror 10, FIG. 1, and forwardly thereof the channel members 11 slidingly receive the front transparent "mirror" 12.

The channel members 9 and 11 are carried by a connecting cross-piece 14, having a longitudinal aperture 15, at FIG. 4, adapted to receive a shaft 16, FIG. 1, which enters apertures at the sides of the head $4^x$.

The head $4^x$ is provided with the usual eyepiece 18, as shown in FIG. 1, so that the operator may view the visual image which is thrown upon a sheet carried by the table-like extension 2.

It will thus be seen that the complete drawing device consists of a drawing surface raised to an angle for the draftsman and rigidly connected with an optical head containing an eyepiece, reflecting mirrors and a control for rotating these mirrors as shown in FIG. 1.

The operation of the instrument is indicated in FIG. 1 Point P of the object is seen as image point $P^1$ on the drawing surface through its reflection from mirrors 12 and 10. The mirror assembly consists of 12, which is unsilvered glass, and 10, which is silvered. The two mirrors meet at an angle A and can rotate on the shaft centered on the line of intersection of the reflecting surfaces. Light from point P is partly transmitted through unsilvered mirror 12, and partly reflected to the eye at an angle. When this angle is a small angle the reflection is greater and therefore the object image is bright. When it is a large angle the reflection is less and the image is dim. The mirror assembly is rotated around its pivot point to increase or decrease said angle and thus control the image brightness. The arrangement shown permits the brightness to be changed without a shifting of the image P (which of course would defeat the purpose of the instrument). The reflection of point P meets mirror 12 at an angle, and mirror 10 at a sharper angle. When the image is brightened by rotating the mirror assembly so that the angle of mirror 12 is decreased, the reflection angle of mirror 10 will likewise be decreased by the same amount, and thus compensates exactly for the change in the angle of mirror 12. Therefore there is no image shift of point $P^1$. Conversely an increase in the angles of the mirrors, to dim the image, results in a corresponding increase in the reflection angle with again no shift of the image position. The fixed angle between the mirrors is set at one half the angle of the drawing surface 2 from vertical. With these angles the center of the field of vision is perpendicular to the drawing surface and lies on the horizon in the object field.

It will be understood that various modifications may be made in the form and arrangement of the elements constituting the embodiment illustrated in the drawings, without departing from the spirit of the invention.

Having described our invention, what we claim and desire to secure by Letters Patent, is as follows:

A camera lucida instrument consisting of a base member having an inclined front area which has a flat upper surface and adapted to support a sheet for receiving a visual image and to enable an operator to reproduce the image on the sheet, said front area of the base member sloping downwardly toward the rear area of the base member, a standard carried by the base member at its rear area, a box-like head carried by the standard, the head having an open area at its front, the head being fixed to the standard, an eyepiece fixedly carried at the upper rear area of said head, a carrier within the head, a rear reflecting mirror and forwardly thereof a transparent mirror, said mirrors being held by the carrier below said eyepiece forwardly thereof and with an angle between the mirrors of substantially one half of the angle between the normal to the rear area of the base member and the plane of said flat upper surface of the base member, both mirrors sloping from the lower front to the upper rear of said standard head, means carried by the standard and engaging said mirror carrier, said carrier being pivoted at substantially the line of intersection of the planes of the mirrors, said means extending outwardly of the standard and being adapted for swinging the carrier, said eyepiece being inclined on a line perpendicular to said flat upper surface of the base member.

(References on following page)

References Cited by the Examiner

UNITED STATES PATENTS

| | | | |
|---|---|---|---|
| 1,674,321 | 6/1928 | De Lancey | 88—24 |
| 2,079,508 | 5/1937 | Kaplowitz | 88—1 |
| 2,111,198 | 3/1938 | Vice | 88—24 |

FOREIGN PATENTS

| | | |
|---|---|---|
| 919,139 | 2/1947 | France. |
| 416,646 | 9/1934 | Great Britain. |
| 430,508 | 6/1935 | Great Britain. |

JEWELL H. PEDERSEN, *Primary Examiner.*

J. S. GOLDHAMMER, R. STERN, *Assistant Examiners.*